United States Patent
Smith et al.

(10) Patent No.: US 8,797,518 B2
(45) Date of Patent: Aug. 5, 2014

(54) IDENTIFIABLE VISIBLE LIGHT SOURCES FOR FIBER OPTIC CABLES

(75) Inventors: Bryan Smith, Cullman, AL (US); Max Bartlett, Alpine, AL (US); Michael L. Shrove, Oakman, AL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 418 days.

(21) Appl. No.: 12/899,636

(22) Filed: Oct. 7, 2010

(65) Prior Publication Data

US 2012/0086935 A1    Apr. 12, 2012

(51) Int. Cl.
*G01N 21/00*    (2006.01)

(52) U.S. Cl.
USPC .................................................. 356/73.1

(58) Field of Classification Search
None
See application file for complete search history.

(56) References Cited

U.S. PATENT DOCUMENTS

| | | | |
|---|---|---|---|
| 4,875,772 A * | 10/1989 | Gentile | 356/73.1 |
| 5,196,899 A * | 3/1993 | Serwatka | 356/73.1 |
| 5,521,701 A * | 5/1996 | Felger et al. | 356/218 |
| 5,572,016 A * | 11/1996 | Wood et al. | 250/227.15 |
| 5,754,285 A * | 5/1998 | Eslambolchi et al. | 356/73.1 |
| 6,094,261 A * | 7/2000 | Contarino, Jr. | 356/73.1 |
| 6,157,443 A * | 12/2000 | Jennings et al. | 356/73.1 |
| 6,185,020 B1 * | 2/2001 | Horiuchi et al. | 398/31 |
| 6,430,348 B1 | 8/2002 | Asano | |
| 6,816,244 B2 * | 11/2004 | Esmaeili | 356/73.1 |
| 7,068,358 B2 * | 6/2006 | Beller et al. | 356/73.1 |
| 7,742,577 B1 | 6/2010 | Reddy | |
| 7,848,645 B2 * | 12/2010 | Healey et al. | 398/16 |
| 8,045,174 B2 * | 10/2011 | Sikora et al. | 356/478 |
| 8,095,003 B2 * | 1/2012 | Peterson, Jr. | 398/21 |
| 8,208,134 B1 * | 6/2012 | Gunal | 356/73.1 |
| 8,467,041 B2 * | 6/2013 | Dinjian et al. | 356/73.1 |
| 2002/0076034 A1 | 6/2002 | Prabhu | |
| 2002/0076176 A1 * | 6/2002 | Flatt | 385/100 |
| 2007/0014526 A1 * | 1/2007 | Lazo | 385/134 |
| 2009/0060418 A1 * | 3/2009 | Munn | 385/53 |
| 2010/0238428 A1 * | 9/2010 | Glines et al. | 356/73.1 |

OTHER PUBLICATIONS

EXFO Electro-Optical Engineering Inc. "FTO-150 Compact OTDR," 2009, 8 pages.*
AGL Telecommunications, "Fiber Optic Loss Test Kits", Test & Inspection, 1 page; Revision Apr. 1, 2005.

* cited by examiner

*Primary Examiner* — Gordon J Stock, Jr.
(74) *Attorney, Agent, or Firm* — Guntin & Gust, PLC; Ralph Trementozzi (57) ABSTRACT

A system that incorporates teachings of the present disclosure may include, for example, a method including generating a plurality of identifiable visible light sources having at least one constant visible light source and at least one oscillating visible light source and selectively applying, such as one at a time, at least two identifiable visible light sources among the plurality of identifiable visible light sources to a fiber optic cable strand in order to remotely test a fiber optic cable having a plurality of strands including the fiber optic cable strand. Other embodiments are disclosed.

20 Claims, 6 Drawing Sheets

IDENTIFIABLE VISIBLE LIGHT SOURCES FOR FIBER OPTIC CABLES

FIELD OF THE DISCLOSURE

The present disclosure relates generally to fiber optic cable troubleshooting.

BACKGROUND

Visual Fault Locators (VFLs) can diagnose and repair simple fiber link problems. A laser-powered VFL can locate fibers, verify continuity and polarity, and help find breaks in cables, connectors and splices. A VFL can include a bright red visible laser light source to help in location of fiber faults including tight bends, breaks and bad connectors. When a field technician services a fiber in a cable or a splice, the technician typically needs to connect their light source device to one fiber and a VFL to a spare at a frame in the central office (CO) and hope that both make the distance to the field site. The technician may need to make several trips back to the frame in order to troubleshoot or diagnose faults in a fiber optic cable.

DETAILED DESCRIPTION

The present disclosure describes, among other things, illustrative embodiments of a plurality of identifiable visible light sources used for troubleshooting fiber optics. Other embodiments are contemplated by the present disclosure.

One embodiment of the present disclosure includes a device comprising a plurality of identifiable visible light sources having a constant visible light source and at least one oscillating visible light source, a switch selector operable to switch among the constant visible light source and the at least one oscillating visible light source, and an optical fiber connector coupled to the plurality of identifiable visible light sources where the optical fiber connector enables application of each of the visible lights sources of the plurality of visible light sources to a single fiber optic cable fiber strand.

One embodiment of the present disclosure includes a non-transitory computer-readable storage medium, comprising computer instructions to remotely switch among a plurality of identifiable visible light sources in response to a remote request, wherein the plurality of identifiable visible light sources include at least a constant visible light source and at least one oscillating visible light source and selectively apply the plurality of identifiable visible light sources to a single fiber optic cable fiber strand for remote testing.

One embodiment of the present disclosure includes a method comprising the element of generating a plurality of identifiable visible light sources comprising at least one constant visible light source and at least one oscillating visible light source and the element of selectively applying one at a time at least two identifiable visible light sources among the plurality of identifiable visible light sources to a fiber optic cable strand to remotely test a fiber optic cable having a plurality of strands including the fiber optic cable strand.

Figure 1:
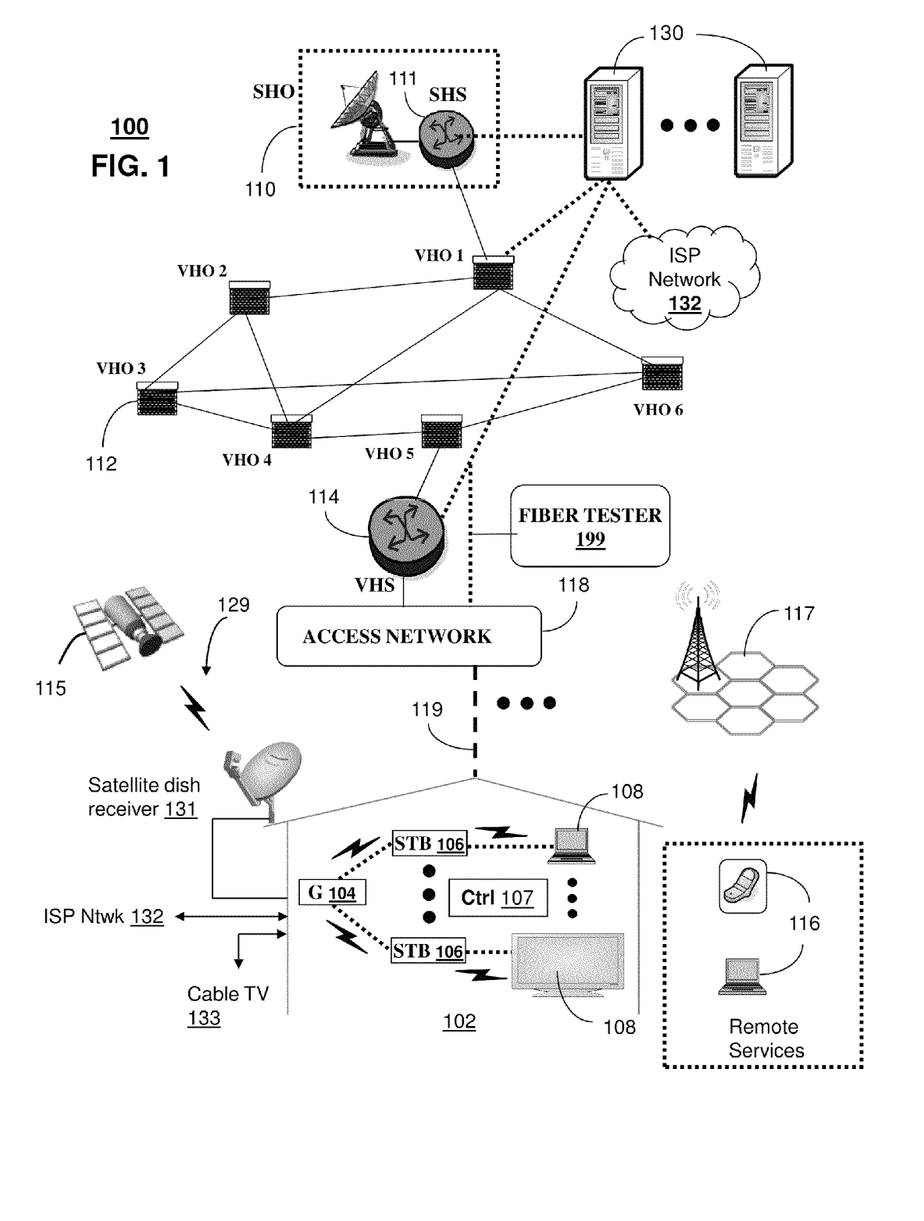
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

System 100 can include a fiber tester 199 that allows for generating a plurality of identifiable visible lights sources to be used for troubleshooting fiber optics. The visible light sources can include constant visible light sources and/or oscillating visible light sources. The fiber tester 199 can selectively apply, one at a time, at least two identifiable visible light sources among the plurality of identifiable visible light sources to a fiber optic cable strand to remotely test a fiber optic cable having a plurality of strands including the fiber optic cable strand. Remote actuation can also be utilized to facilitate the process. Before these embodiments, separate equipment would be needed to perform the visual fault location and the other testing using identifiable visible light sources that are identifiable using various levels of oscillation or various visible wavelengths. Furthermore, the claimed embodiments allow the easy application of test signals on a single fiber optic cable strand. The embodiments here can also eliminate the need to remove one test device to apply another.

Figure 2:
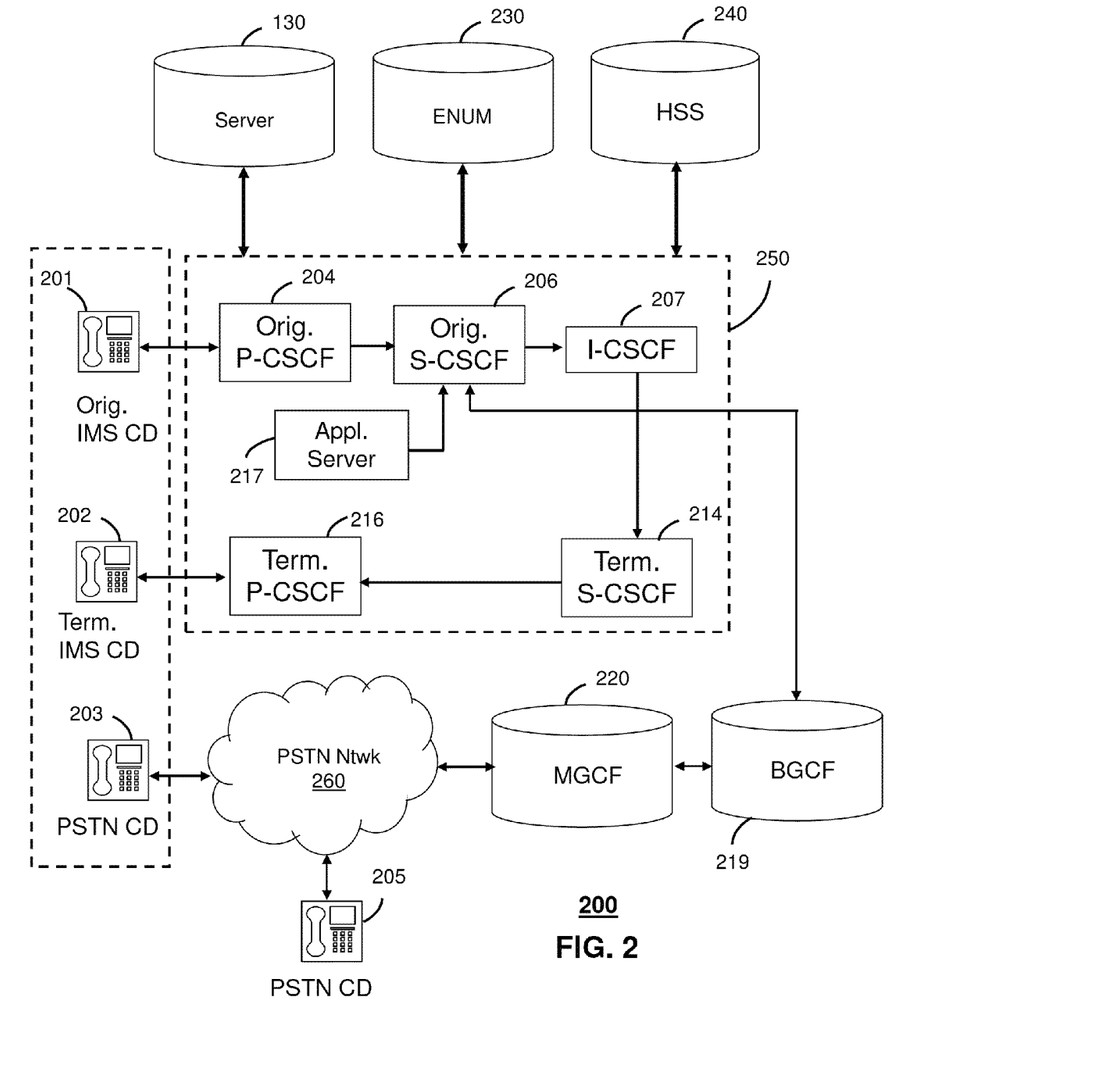

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 then signals the CD 202 to establish Voice over Internet Protocol (VoIP) communication services, thereby enabling the calling and called parties to engage in voice and/or data communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice communications.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201 and 202 with the multimedia and Internet services of communication system 100.

It is further appreciated that the CDs of FIG. 2 can operate as wireline or wireless devices. Although not shown, the CDs of FIG. 2 can be communicatively coupled to a cellular base station, a femtocell, a WiFi router, a DECT base unit, or another suitable wireless access unit to establish communications with the IMS network 250 of FIG. 2. Accordingly, multiple wireline and wireless communication technologies are contemplated for the CDs of FIG. 2. The fiber optic tester 199 (of FIG. 1) can be utilized in the IMS network 250 to accordingly test fiber optic interconnections therein.

Figure 3:
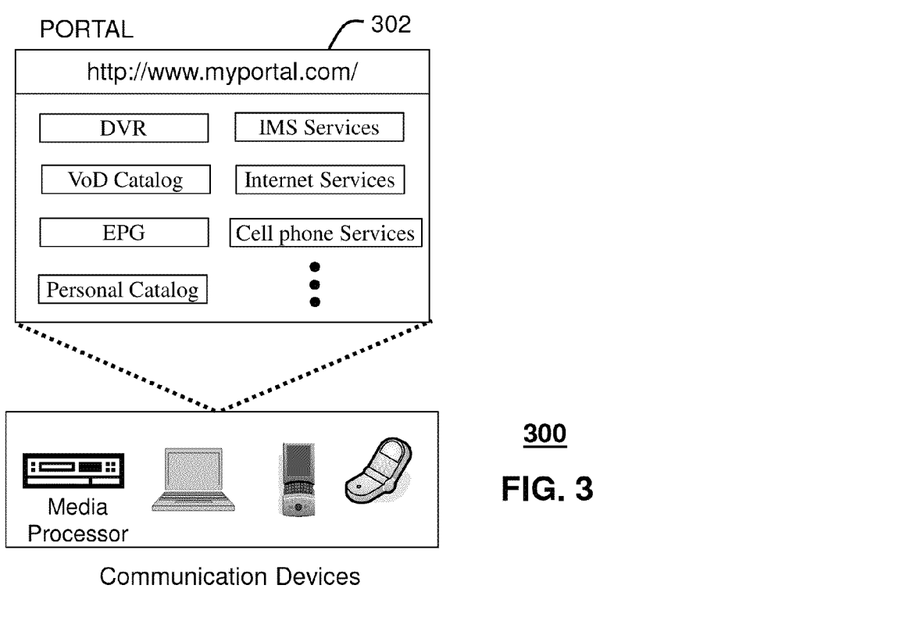
FIG. 3 depicts an illustrative embodiment of a portal interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with a Internet browser such as Microsoft's Internet Explorer™, Mozilla's Firefox™, Apple's Safari™, or Google's Chrome™ using an Internet-capable communication device such as those described for FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor 106. The portal 302 can also be used for provisioning IMS services described earlier, provisioning Internet services, provisioning cellular phone services, and so on.

Figure 4:
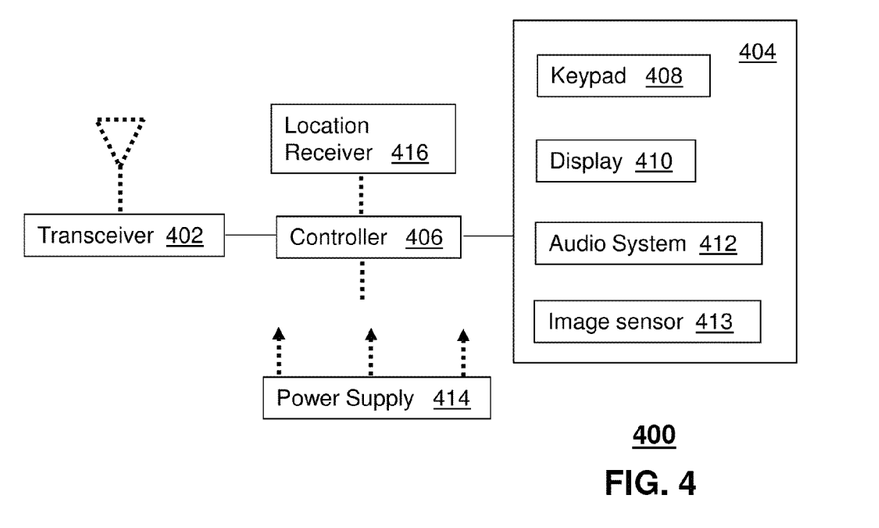
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with its navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
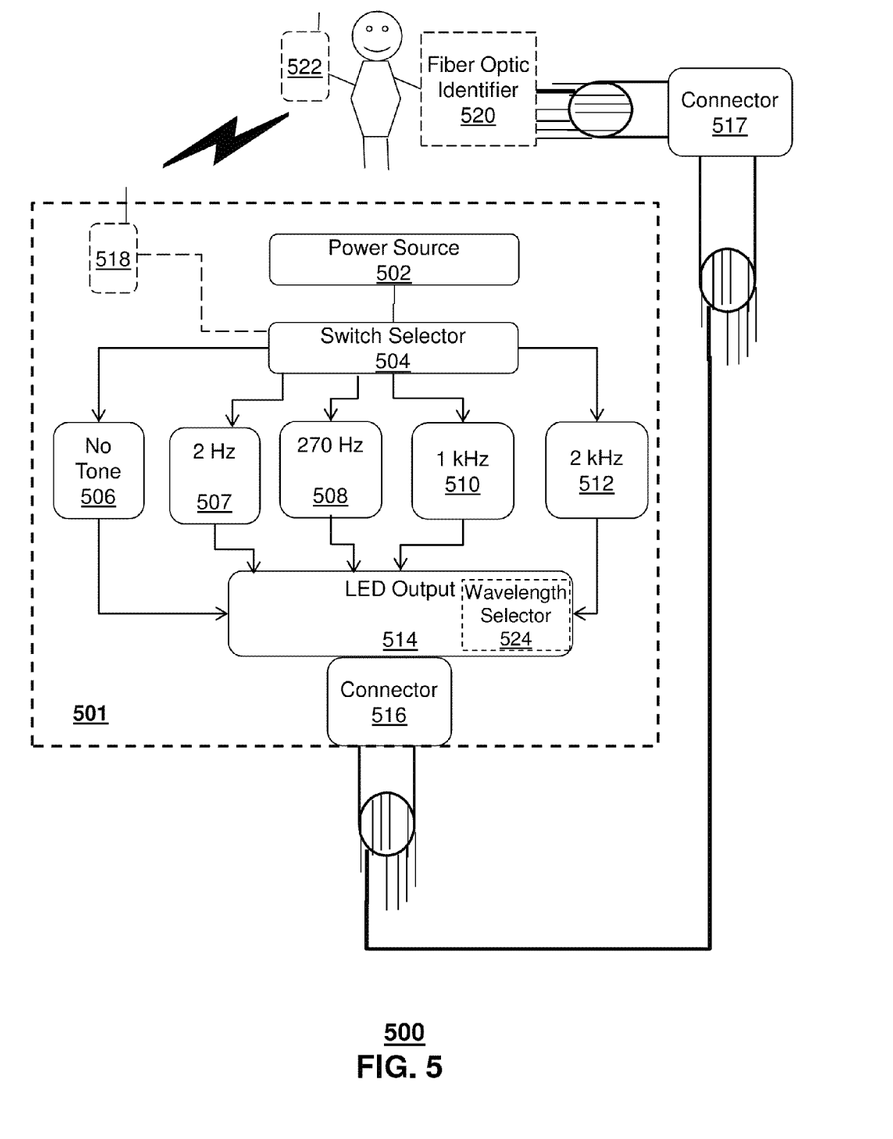
FIG. 5 depicts an illustrative embodiment of a communication system having fiber optic cables under test.

FIG. 5 depicts an illustrative fiber optic communication system 500 using a device 501 for testing or troubleshooting a fiber optic cable using visible light. The visible light can have a range of wavelengths between 400 nanometers and 700 nanometers and in one particular embodiment, 670 nanometers can be used which provides a red color that is easily seen by the technician. The device 501 can include a power source 502 for selectively supplying power to a light source, such as a plurality of identifiable visible light sources that can be embodied by a light emitting diode (LED) light source 514 serving as a number of light sources. The light source can be selectively driven as a constant light source using a "no tone" generator 506 or selectively driven as an oscillating light source by applying the LED light source 514 using one of a plurality of oscillating generators 507, 508, 510 or 512 oscillating at 2 Hertz, 270 Hertz, 1 kilohertz, or 2 kilohertz for example to form a corresponding oscillating visible light source. It should be understood that other frequencies can also be utilized. Optionally, the light source can also be varied in terms of wavelength using a variable wavelength LED for example.

The constant visible light source and each of the oscillating visible light sources is visible and distinguishable using a fiber optic identifier 520 for example that can distinguish among visible light sources that oscillate at different frequencies. Existing fiber optic identifiers can distinguish lights that oscillate at different frequencies including the noted frequencies above of 270 Hertz, 1 kilohertz, or 2 kilohertz. A visible light oscillating at 2 Hertz or other low frequencies can be distinguishable to the naked eye. Optionally, a tunable LED can be used to provide a visible light source that can vary in wavelength using a wavelength selector 524 for example. Assuming a suitable fiber optic identifier is used, the identifier can also distinguish between lights of different visible wavelengths or a combination of different wavelengths and different oscillations or strobing frequencies. The device 501 can also include a switch selector 504 operable to switch among the constant visible light source (506) and the oscillating visible light sources (507, 508, 510, or 512) and can also include an optical fiber connector 516 coupled to the plurality of identifiable visible light sources. The optical fiber connector 516 enables application (one at a time) of each of the visible lights sources of the plurality of visible light sources to a single fiber optic cable fiber strand. Thus, at least two of the plurality of identifiable visible light sources can be applied sequentially to a single fiber optic cable fiber strand.

The device 501 can be mounted at a frame in a central office of a fiber optic telecommunication system. The device 501 can alternatively be built as a portable device instead of wall mounted at a central office frame. In existing systems if a field technician is dispatched for troubleshooting a particular fiber in a cable or splice, the technician needs to first dispatch to the central office and connect a light source device to one fiber and a visual fault locator light (VFL) to a spare, then dispatch to the field while hoping that both the light source device and the VFL can cover the distance associated with the particular fiber. The technician may make several trips back and forth to the frame. Instead, using the device 501 of the present disclosure, the technician can use the device 501 to apply multiple signals on the same fiber so that several opportunities to detect the signal using different techniques can be achieved using for example 1 khz tone, a 2 khz tone, a 270 hz tone, a 2 Hertz tone or a constant light source without oscillation. The embodiments herein can broaden what was previously considered a Visual Fault Locator VFL light to include visible lights that oscillate at speeds indistinguishable to the naked eye. The optional variable wavelength LED can also provide more flexibility. For example, upstream and downstream signaling can be distinguished by using different color or different wavelengths of light for each direction, not to mention the different oscillation frequencies that could also be used.

As a frame mounted device, the device 501 could be used as a "test shoe" (used for carrying out tests of connections in a main distribution board in the telecommunication industry) and be connected by a frame technician (working at the central office), saving the field technician from a dispatch to the field and saving time. The field technician would also avoid having to leave two pieces of test equipment at the frame (or customer) all day. Because the light is also identifiable by the naked eye, it can be used as a stand-alone device in certain routes, such as under 18,000 feet. In one embodiment, a field technician can remotely switch among the plurality of visual light sources using a wireless transmitter or transceiver 522 that communicates with a wireless receiver or transceiver 518 within the device 501. The receiver or transceiver 518 can be used to control the switching function of a switch selector 504. Thus, the field technician at a remote site (from device 501) can test a strand of optic fiber in a cable coupled to connector 517 for example. If the tests are inconclusive, the technician can call a frame technician at the frame and request to switch visible light sources or the field technician can remotely control the switch selector 504 using wireless communication as discussed above.

The device 501 or fiber test 199 (of FIG. 1) can include various connectors that allow the device 501 or fiber tester 199 to be mounted, such as at a frame in a central office of a fiber optic telecommunication system or at any location between the central office and the premise (where fiber optic cable is used). The device 501 or fiber test can also have dimensions, such as a size, shape, and weight, that allow the device to be a portable device.

Figure 6:
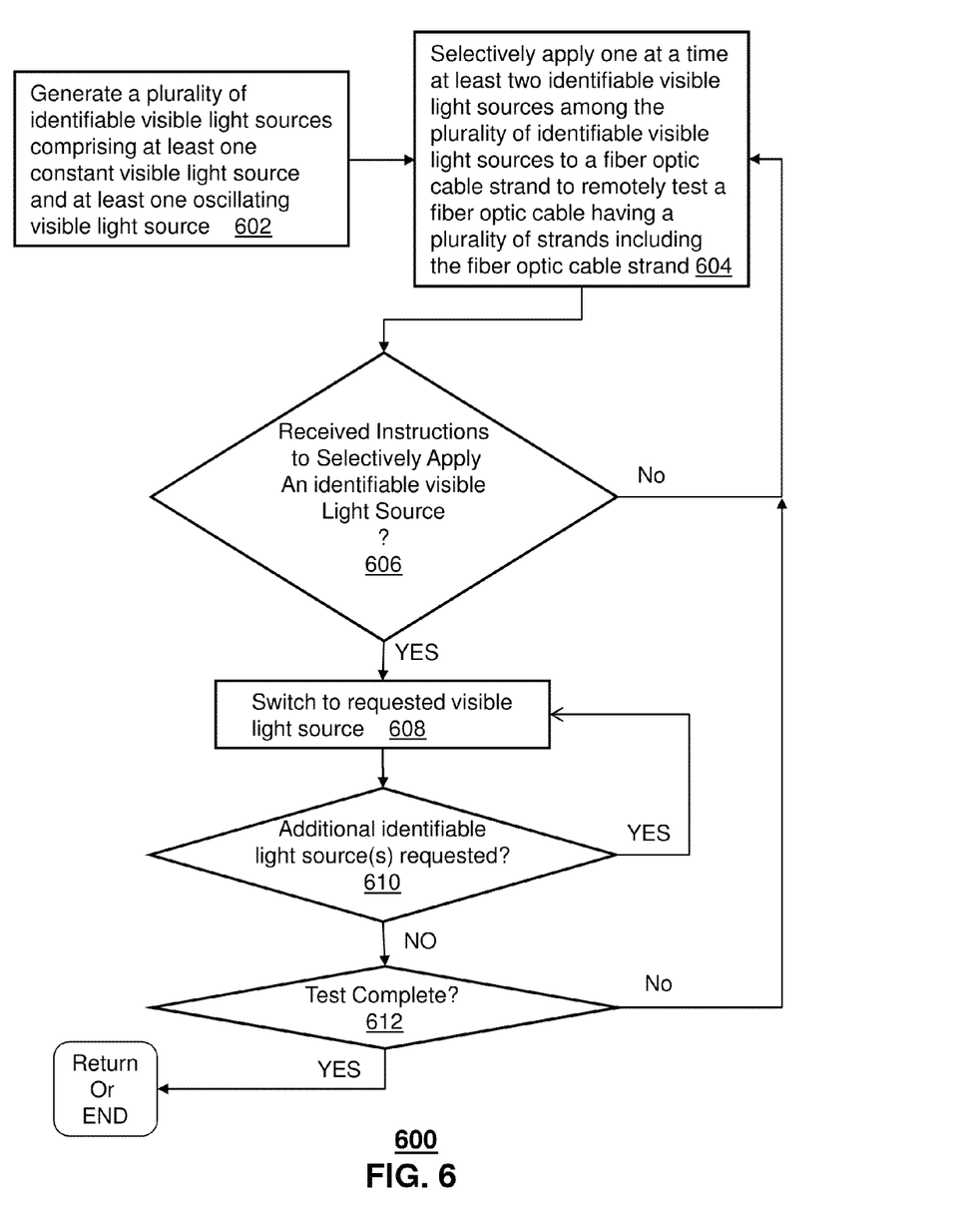
FIG. 6 depicts an illustrative embodiment of a method operating in portions of the systems described in FIGS. 1-5.

FIG. 6 depicts an illustrative method 600 that operates in portions of the devices of FIGS. 1-5. Method 600 can begin with step 602 in which a plurality of identifiable visible light sources are generated. The light sources can include one or more constant visible light sources and/or one or more oscillating visible light sources. The method 600 can then selectively apply, such as one at a time, at least two identifiable visible light sources among the plurality of identifiable visible light sources to a fiber optic cable strand to remotely test a fiber optic cable having a plurality of strands including the fiber optic cable strand, at 604. At decision block 606, a determination can be made whether instructions have been received to selectively apply an identifiable visible light source. If instructions are received for a particular visible light source, then a switch can be made to the requested visible light source, at 608 which can be done without having the field technician running back and forth between the test point and the light source application point (which can be at a frame at the central office). If there are additional light sources requested at decision block 610, then the method returns to 608. If no additional light sources are requested at 610, then a determination can be made whether the testing is complete, at 612. If the testing is not complete, then the method 600 can return to 604. If testing is complete at 612, the method 600 can return to 602 or can end.

Upon reviewing the aforementioned embodiments, it would be evident to an artisan with ordinary skill in the art that said embodiments can be modified, reduced, or enhanced without departing from the scope of the claims described below. For example, different ways of generating and identifying the plurality of visible light source can be used. As discussed above, visible light sources can be distinguishable in some cases by mere visible inspection, but in many instances they are not. Visible light may be oscillating or strobing at different frequencies and may not be distinguishable to a naked eye. Lights of different wavelengths can also be difficult to distinguish.

Figure 7:
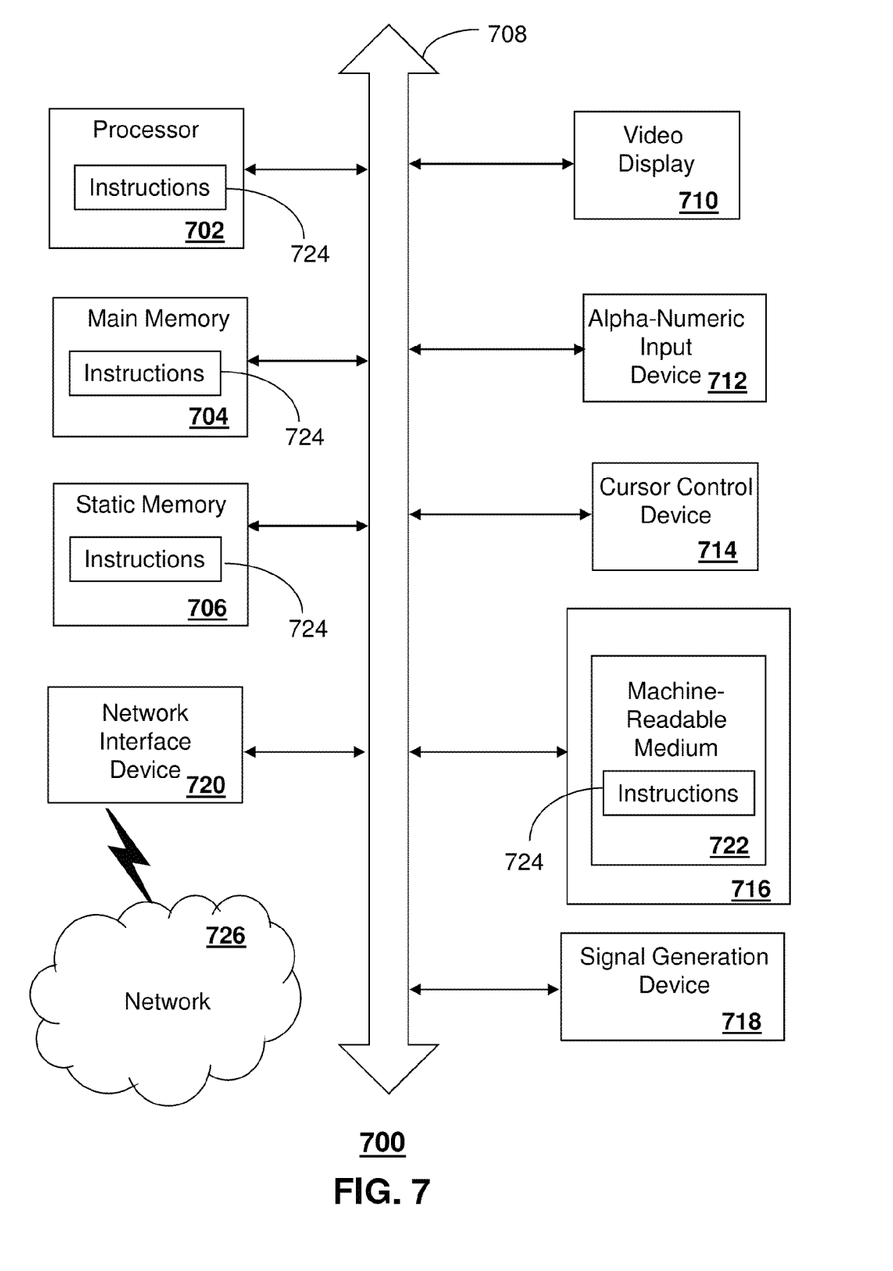
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methods discussed above. The machine can operate, for example, as the device 501 as described above operating as a stand-device for portable use on fiber optic cable along the cable line from the central office to the DSLAM to the residential gateway or the customer premise or at another location. In some embodiments, the machine operates as a standalone device and in others as mounted within a frame at a central office. In one embodiment, the device 501 can include wireless communication capability and it is contemplated that the device 501 can be integrated with a cellular phone for example. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display). The computer system 700 may include an input device 712 (e.g., a keyboard), a cursor control device 714

(e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a plurality of signal sources to provide a plurality of signals;
   a light source in communication with the plurality of signal sources to provide light of a constant wavelength;
   a wireless receiver to receive a plurality of wireless commands from a wireless transmitter;
   a switch selector in communication with the plurality of signal sources and the wireless receiver to selectively couple one of a first oscillating signal or a second oscillating signal of the plurality of signals to the light source responsive to receiving by way of the wireless receiver a first wireless command of the plurality of wireless commands from the wireless transmitter to generate one of a first strobe light source of the constant wavelength and first strobe frequency or a second strobe light source of the constant wavelength and a second strobe frequency, wherein one of the first strobe light source, the second strobe light source or a combination thereof oscillates at a speed indistinguishable to a naked eye, and to selectively couple a non-oscillating signal of the plurality of signals to the light source to generate a non-oscillating light source responsive to receiving by way of the wireless receiver a second wireless command of the plurality of wireless commands from the wireless transmitter to generate a non-strobe light source of the constant wavelength, wherein the first strobe light source and the second strobe light source are identifiable according to a respective one of the first strobe frequency and the second strobe frequency; and an optical fiber connector to sequentially couple the first strobe light source, the second strobe light source and the non-strobe light source to a first end of a fiber optic strand collocated with the wireless receiver for identifiable detection of one of the first strobe frequency of the first strobe light source, the second strobe frequency of the second strobe light source or the non-strobe light source at a second end of the fiber optic strand collocated with the wireless transmitter.

2. The device of claim 1, wherein the switch selector selectively couples a second oscillating signal of the plurality of signals to the light source responsive to receiving a third wireless command of the plurality of wireless commands to generate a second strobe light source of the constant wavelength and second strobe frequency and wherein the optical fiber connector is further adapted to sequentially couple the second strobe light source to the first end of the fiber optic strand.

3. The device of claim 1, wherein the light source comprises a light emitting diode having a selectable light frequency.

4. The device of claim 1, further comprising a power source to selectively supply power to the light source and the plurality of signal sources.

5. The device of claim 1, wherein the first strobe light source comprises a selectable strobe frequency ranging from 2 Hertz to 2 kilohertz.

6. The device of claim 1, wherein the first strobe light source is detectable at the second end of the fiber optic strand using one of a human eye or a fiber optic identifier.

7. The device of claim 1, wherein the first strobe frequency is distinguishable from the non-strobe light source at the second end of the fiber optic strand.

8. The device of claim 1, comprising connectors to mount the device at a frame in a central office of a fiber optic telecommunication system.

9. The device of claim 1, comprising a housing having a size, shape and weight that allows the device to be a portable visible fiber optic test fixture.

10. The device of claim 1, wherein the non-strobe light source is a visual fault locator light.

11. The device of claim 1, wherein the wireless receiver is coupled to the switch selector to remotely switch among the plurality of signals.

12. A non-transitory machine-readable storage medium, comprising executable instructions, that when executed by a processor, facilitate performance of operations comprising:

selectively coupling one of a first oscillating signal or a second oscillating signal of a plurality of signals to a light source of a constant wavelength in response to a first remote request to generate one of a first strobe light source of the constant wavelength and a first strobe frequency or a second strobe light source of the constant wavelength and a second strobe frequency, wherein one of the first strobe light source, the second strobe light source or a combination thereof oscillates at a speed indistinguishable to a naked eye, the first strobe light source and the second strobe light source being identifiable according to the first strobe frequency and the second strobe frequency, and wherein one of the first strobe light source and the second strobe light source is communicatively coupled to a first end of a fiber optic strand for detection at a second end of the fiber optic strand; and selectively coupling a non-oscillating signal from the plurality of signals to the light source in response to a second remote request to generate a non-strobe light source of the constant wavelength, wherein the non-strobe light source is communicatively coupled to the first end of the fiber optic strand for detection at the second end of the fiber optic strand, and wherein the first and second remote requests originate proximal to the second end of the fiber optic strand.

13. The non-transitory machine-readable storage medium of claim 12, wherein selectively coupling the first oscillating signal and selectively coupling the non-oscillating signal are performed using a wireless receiver at the first end of the fiber optic strand coupled to a switch selector operable to switch among the plurality of signals, wherein the wireless receiver receives wireless commands from a wireless transmitter at the second end of the fiber optic strand.

14. The non-transitory machine-readable storage medium of claim 12, further comprising selectively coupling a second oscillating signal of the plurality of signals to the light source in response to a third remote request to generate a second strobe light source of a second strobe frequency, wherein the second strobe light source is communicatively coupled to the first end of the fiber optic strand.

15. The non-transitory machine-readable storage medium of claim 12, wherein the first strobe light source and the non-strobe light source are distinguishable at the second end of the fiber optic strand.

16. A method, comprising:
generating a plurality of electrical signals;
generating a light source of a constant wavelength;
receiving a wireless signal;
switchably coupling one of a first oscillating signal or a second oscillating signal from the plurality of electrical signals to the light source in response to a first command of the wireless signal, to generate one of a first strobe light source of the constant wavelength and a first strobe frequency or a second strobe light source of the constant wavelength and a second strobe frequency, wherein one of the first strobe light source, the second strobe light source or a combination thereof oscillates at a speed indistinguishable to a naked eye, wherein the one of the first strobe light source or the second strobe light source is communicatively coupled to a first end of a fiber optic strand for detection at a second end of the fiber optic strand, the one of the first strobe light source or the second strobe light source being identifiable at the second end of the fiber optic strand according to a respective one of the first strobe frequency or the second strobe frequency; and switchably coupling a non-oscillating signal from the plurality of signals to the light source in response to a second command of the wireless signal, to generate a non-strobe light source of the constant wavelength, wherein the non-strobe light source is communicatively coupled to the first end of the fiber optic strand for detection at the second end of the fiber optic strand, and wherein the first and second commands of the wireless signal originate proximal to the second end of the fiber optic strand.

17. The method of claim 16, further comprising switchably coupling the second oscillating signal from the plurality of signals to the light source in response to a third command of the wireless signal, to generate a second strobe light source of the constant wavelength and a second strobe frequency, wherein the second strobe light source is communicatively coupled to the first end of a fiber optic strand for detection at the second end of the fiber optic strand.

18. The method of claim 16, wherein the first strobe light source and the non-strobe light source are detectable at the second end of the fiber optic strand using one of a human eye or a fiber optic identifier.

19. The method of claim 16, wherein the light source comprises a light emitting diode.

20. The method of claim 16, wherein the plurality of electrical signals are generated using a plurality of oscillating generator circuits.

* * * * *